April 29, 1924.

R. V. MORSE 1,491,815

OPTICAL LEAD COMPUTER FOR ARTILLERY

Filed April 11, 1921    2 Sheets-Sheet 1

INVENTOR
Robert V. Morse

April 29, 1924.

R. V. MORSE 1,491,815

OPTICAL LEAD COMPUTER FOR ARTILLERY

Filed April 11, 1921  2 Sheets-Sheet 2

INVENTOR
Robert V. Morse

Patented Apr. 29, 1924.

1,491,815

UNITED STATES PATENT OFFICE.

ROBERT V. MORSE, OF ITHACA, NEW YORK.

OPTICAL LEAD COMPUTER FOR ARTILLERY.

Application filed April 11, 1921. Serial No. 460,253.

*To all whom it may concern:*

Be it known that I, ROBERT V. MORSE, a citizen of the United States, residing at Ithaca, in the county of Tompkins and State of New York, have invented a new and useful Optical Lead Computer for Artillery, of which the following, taken with the accompanying drawings, is a specification.

This invention relates to ordnance such as anti-aircraft artillery where it is necessary to automatically and continuously determine the lead of the point of impact ahead of the moving target; and in particular this invention relates to a means for multiplying the angular velocity of the target by the time of flight of the projectile, or other time interval, in order to obtain their product, which is the angular lead or deflection desired.

In Patent No. 1,445,028, issued Feb. 13, 1923, to Robert V. Morse, for lead control system for anti-aircraft artillery, there is described a means for making the lead visible by throwing spots of light on narrow strips or hairs located in one of the focal planes of the lead control telescope, the location of these spots of light indicating the amount of the lead as automatically computed. The beam of light came thru an inclined slot in a drum which was rotated by a magnetic speedometer, and the automatic computation of lead was obtained by rotating the magnet according to the angular velocity of the target, and moving the magnet longitudinally within the drum according to the time interval given, so that both quantities influenced the rotation or deflection of the drum. One object of this invention is to provide separate elements for the velocity quantity and the time quantity, capable of independent calibration, so that when functioning in combination the accuracy of the result will be assured. Another object is to simplify the action required of the speedometer, so that any type of speedometer may be employed. Other objects will be apparent as the description proceeds.

Figure 1:
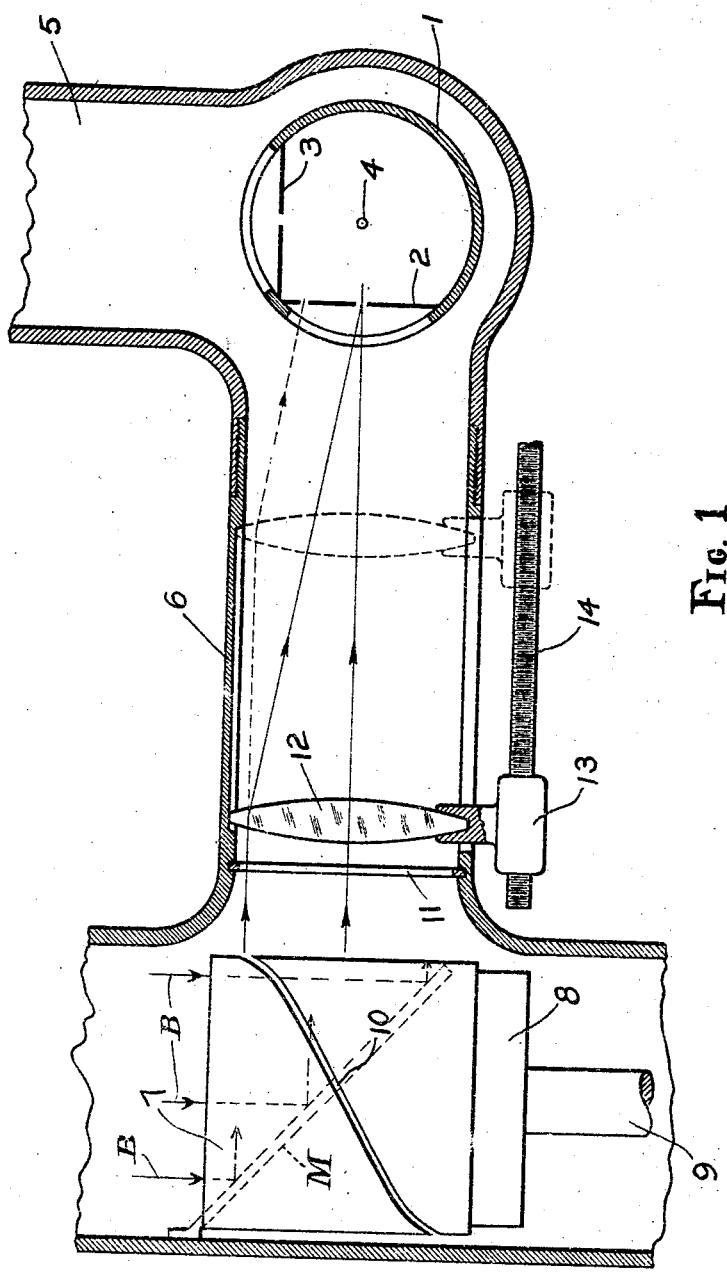
Figure 2:
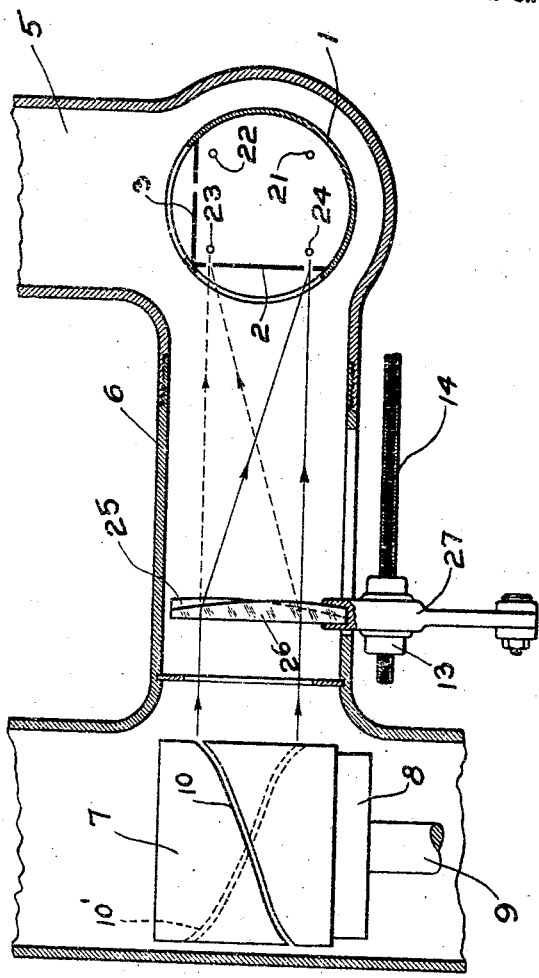
Figure 3:
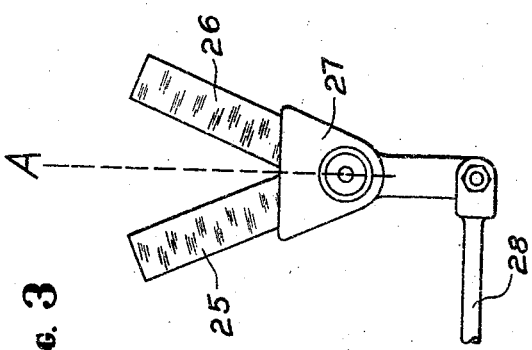

Referring now to the drawings, Fig. 1 shows in cross-section one of the lateral branches thru which the indicating beams of light are thrown into the side of the telescope tube, (also shown in cross-section), and the optical means by which the motion of the beam is modified in accordance with the time interval given. Fig. 2 illustrates a modified form of the apparatus as applied to a lead control telescope having a double or shifting line of sight. Fig. 3 illustrates one manner of shifting the pair of lenses employed in Fig. 2.

Referring now to Fig. 1, the telescope tube 1 of the lead control sight is shown in cross-section near the focal plane where the cross-hairs are located, there being two slots in the tube 1 at this point thru which beams of light may fall upon the strips or lines 2 and 3 to indicate the amount of lead relative to the point of impact 4. Branching laterally from the telescope tube 1 are the indicator tubes 5 and 6 leading to the computing apparatus with which this invention is concerned. It is desired that this computing apparatus shall move a beam of light along the line 2 in an amount corresponding to the product of the angular velocity of the target multiplied by the time interval involved in the lead. The computation of angular velocity, in the form shown in Fig. 1, is made by a magnetic speedometer of the ordinary type, consisting of a light metallic drum 7 within which rotates a magnet 8 mounted on the shaft 9, which is rotated by the operation of the elevating controls of the main apparatus when following the target. A beam of light B from any suitable source is directed into the open end of the drum 7 and reflected by an inclined mirror M, so as to be directed out again thru the side of the drum 7. The drum 7 is provided with an inclined slot 10 thru which the beam of light emerges from the drum 7, so that as the drum 7 is deflected or turned according to the velocity of the target the beam of light is moved up or down to correspond. In Fig. 1 the upper arrow illustrates the location of the beam of light when the drum 7 is turned to its extreme position, as for a very high angular velocity of target, while the lower solid arrow indicates the location the beam would have if the drum 7 were in its central position of zero deflection, as for a target having no vertical velocity. The beam of light passes thru a slot in a diaphragm 11 and then thru a lens 12 which is mounted in a bracket 13 so that it can be moved axially by operating a screw 14. When the lens 12 is in the extreme left position as shown in Fig. 1 its focal length is such that any horizontal beam of light passing thru the lens 12 will be deflected so as to strike the center of the strip 2 opposite the point 4, so as to indicate a zero lead or deflection. This is the position the lens 12 would occupy if the time interval in the problem were given as zero, since any quantity multiplied by zero is zero. On the other hand, when the lens 12 is moved to the extreme right hand position as indicated in dotted lines in Fig. 1, a beam of light passing thru the center of the lens 12 would indicate zero lead on the line 2, but a beam such as indicated by the dotted arrow passing thru the upper edge of the lens 12 would give a correspondingly large indication of lead on the line 2, and any intermediate beam would give a reading in proportion. Since the inclined solid beam of light is parallel to the dotted beam, it will be obvious from the geometrical relations that the amplitude of the lead indication will vary in inverse proportion to the distance of the lens 12 from the line 2. Hence if the position of the lens is adjusted according to the time interval of the problem,—by turning the screw manually or by any suitable mechanical means,—the lead shown on the line 2 will correspond to the product of the angular velocity by said time interval.

It will be understood that a similar mechanism is arranged in the branch 5 with its speedometer connected to the horizontal or azimuth controls of the gun or other apparatus so that the horizontal lead will be indicated on the line 3. It will also be understood that the speedometer need not necessarily be of the magnetic type, as any other type of speedometer might be arranged to control the initial location of the beam of light, as will be obvious to those skilled in the art.

When the lead control telescope 1 is of the multiple line type, as described for example in my copending application Ser. No. 459,833, double line lead control system filed April 9, 1921, the modification shown in Fig. 2 and Fig. 3 may be employed. In this type of lead control sight the line of sight, or point of impact, is not located in the center of the field of vision, as the point 4 is in Fig. 1, but is located in one of the four corners of the field, such as 21, 22, 23, or 24, depending on the direction in which the target is headed. Thus if the target is moving to the left and downward, the point 24 is taken as the impact point and the lead is increased by moving the light spot upward on the line 2; while if the target is headed upward, the point 23 would be the impact point and the lead would be increased by moving the light spot downward on the line 2. Since the center of the lens employed must lie on a direct line with the point of impact as shown in the field of view, it is necessary to shift the lens when the location of the impact point is shifted, and one simple manner of doing this is to employ two lenses 25 and 26, one having its optical axis opposite the point 23 when in position, and the other having its optical axis opposite the point 24 when in position, and pivot the lens holder 27 so that the lenses may be shifted into and out of position when the impact point is shifted. This action is obtained by connecting a link 28 to the same mechanism which is used to shift the sight line into the stated positions. For example, in Fig. 2 the lens 26 is shown as swung into the line A of Fig. 3 so as to intercept the beam of light, which accordingly is deflected downward as shown by the solid arrow line to the point 24 as its zero position; while if the lens 25 were swung into action it would cause the point 23 to become the zero position. The principle and action of this modification is otherwise similar to Fig. 1, except that a pair of inclined slots 10 and 10' are required at the drum 7, instead of a single slot. The lens system 25—26 is moved axially by the operation of the screw 14, in accord with the time interval of the problem, and modifies the amplitude of the motion of the ray of light as described in connection with Fig. 1.

It will be understood that the optical properties of the lens herein treated are primarily concerned with the action of the lens on a single ray or narrow beam of light, and not with the focusing of a great number of rays as in the ordinary use of a lens. However, if desired, the lens may be given a sufficiently spherical shape to slightly focus or narrow the beam as it proceeds to the strip 2, and thus increase its brilliancy to a certain extent.

The invention has been described in two illustrative forms by way of example, and it will be understood that the invention is not limited to the precise form herein shown, as various modifications and adaptations will be obvious to the skilled designer without departing from the scope of the invention as described in the following claims.

1. In a computing apparatus, the combination of a lens, means for projecting a narrow beam of light, means for moving the beam transversely to the lens according to the values of one factor, means for moving the lens axially according to the values of another factor, and means whereby the resultant variation of the beam may be observed, so that a visible indication of the product of the two factors may be made.

2. In a computing apparatus, the combination of a lens, means for projecting a narrow beam of light, means for moving the beam transversely to the lens according to the values of one factor, means for moving the lens axially according to the values of another factor, a telescope tube, and means located in the telescope tube upon which the resultant beam may fall, whereby a visible indication of the product of the two factors may be observed.

3. In a computing apparatus, the combination of a lens, means for projecting a narrow beam of light, means for moving the beam transversely to the lens according to the values of one factor, a screw by which the lens may be moved axially according to the values of another factor, a telescope tube, a line lying in a focal plane of the telescope tube and arranged so that the beam after passing thru the lens may fall upon the line, whereby the location of the light spot on the line may serve as an indication of the product of the two factors.

4. In a computing apparatus, the combination of a lens, means for projecting a narrow beam of light, a shaft, means responsive to the speed of rotation of the shaft for moving the beam transversely to the lens, means for moving the lens axially according to the values of a time interval, a telescope tube, and means whereby the resultant action of the beam may be observed in the field of vision of the telescope tube, whereby the angular distance corresponding to a given speed and time may be observed as it would appear in space.

5. In a computing apparatus, the combination of a lens system, means for projecting a narrow beam of light, means for moving the beam transversely to the lens system according to the values of one factor, means for moving the lens system axially according to the values of another factor, means whereby the resultant variation of the beam may be observed so that a visible indication of the product of the two factors may be made, and means for changing the location of the axis of the lens system so as to change the zero point of the indication.

6. In a computing apparatus, the combination of means for projecting a narrow beam of light, means for moving the beam according to the values of one factor, optical means for inclining the beam toward a focal point, means for intercepting the beam after modification by the optical means, means for varying the distance between the optical means and the intercepting means according to the value of a second factor, whereby the location of a spot of light on the intercepting means will serve as an indication of the product of the two factors.

7. In a computing apparatus, the combination of means for projecting a narrow beam of light, means for moving the beam according to the values of one factor, optical means for inclining the beam toward a focal point, means for intercepting the beam after modification by the optical means, means for varying the distance between the optical means and the intercepting means according to the value of a second factor, whereby the location of a spot of light on the intercepting means will serve as an indication of the product of the two factors, and means for changing the location of the axis of the optical means so as to change the zero point of the indication.

In witness whereof I have hereunto set my hand this 9th day of April, 1921.

ROBERT V. MORSE.